US008190618B2

(12) United States Patent
Berstis et al.

(10) Patent No.: US 8,190,618 B2
(45) Date of Patent: *May 29, 2012

(54) SYSTEMS, METHODS, AND MEDIA FOR AGGREGATING ELECTRONIC DOCUMENT USAGE INFORMATION

(75) Inventors: Viktors Berstis, Austin, TX (US); Randolph Michael Forlenza, Austin, TX (US)

(73) Assignee: Google Inc., Mountain View, CA (US)

( * ) Notice: Subject to any disclaimer, the term of this patent is extended or adjusted under 35 U.S.C. 154(b) by 920 days.

This patent is subject to a terminal disclaimer.

(21) Appl. No.: 11/950,214

(22) Filed: Dec. 4, 2007

(65) Prior Publication Data

US 2008/0086692 A1    Apr. 10, 2008

Related U.S. Application Data

(63) Continuation of application No. 11/032,871, filed on Jan. 11, 2005, now Pat. No. 7,386,569.

(51) Int. Cl.
*G06F 17/30* (2006.01)

(52) U.S. Cl. ...................................... 707/751

(58) Field of Classification Search .................... 707/751
See application file for complete search history.

(56) References Cited

U.S. PATENT DOCUMENTS

| | | | |
|---|---|---|---|
| 5,630,125 A | 5/1997 | Zellweger | |
| 5,819,451 A | 10/1998 | Khon | |
| 5,899,995 A | 5/1999 | Millier et al. | |
| 6,182,067 B1 | 1/2001 | Presnell et al. | |
| 6,353,824 B1 * | 3/2002 | Boguraev et al. | 715/277 |
| 6,370,551 B1 | 4/2002 | Golovchinsky et al. | |
| 6,377,983 B1 | 4/2002 | Cohen et al. | |
| 6,393,427 B1 | 5/2002 | Vu et al. | |
| 6,553,373 B2 * | 4/2003 | Boguraev et al. | 1/1 |
| 6,678,699 B2 | 1/2004 | Stephens et al. | |
| 6,732,090 B2 * | 5/2004 | Shanahan et al. | 1/1 |
| 6,778,979 B2 * | 8/2004 | Grefenstette et al. | 1/1 |
| 6,820,075 B2 * | 11/2004 | Shanahan et al. | 715/205 |
| 6,865,572 B2 * | 3/2005 | Boguraev et al. | 1/1 |
| 6,928,425 B2 * | 8/2005 | Grefenstette et al. | 715/209 |
| 6,948,163 B2 * | 9/2005 | Melahn et al. | 717/168 |
| 6,959,319 B1 * | 10/2005 | Huang et al. | 709/203 |
| 7,069,271 B1 * | 6/2006 | Fadel et al. | 705/26 |
| 7,117,432 B1 * | 10/2006 | Shanahan et al. | 715/210 |
| 7,133,862 B2 * | 11/2006 | Hubert et al. | 1/1 |
| 7,181,438 B1 | 2/2007 | Szabo | |

(Continued)

OTHER PUBLICATIONS

Non-final office action dated Apr. 19, 2007 for U.S. Appl. No. 11/032,872.

(Continued)

*Primary Examiner* — Mark A Radtke
(74) *Attorney, Agent, or Firm* — Fish & Richardson P.C.

(57) ABSTRACT

Systems, methods and media for determining and aggregating electronic document segment usage information from different versions of a document are disclosed. More particularly, hardware and/or software for determining the aggregate segment usage for an electronic document received from one or more users are disclosed. Embodiments include receiving from one or more users an indication of their usage of segments of different versions of the electronic document, aggregating the segment usage indications received, and creating document utilization information for the electronic document. Further embodiments include transmitting the document utilization information to one or more users. Other embodiments include displaying to the user an electronic document and indications of the document utilization information. Electronic documents may be in PDF format, HTML format, etc.

28 Claims, 4 Drawing Sheets

U.S. PATENT DOCUMENTS

| | | | |
|---|---|---|---|
| 7,249,314 B2 * | 7/2007 | Walker et al. | 715/205 |
| 7,284,191 B2 * | 10/2007 | Grefenstette et al. | 715/230 |
| 7,313,827 B2 * | 12/2007 | Kelley et al. | 726/28 |
| 7,367,048 B2 * | 4/2008 | Kelley et al. | 726/2 |
| 7,383,305 B2 * | 6/2008 | Kelley et al. | 709/206 |
| 7,386,569 B2 * | 6/2008 | Berstis et al. | 1/1 |
| 7,386,783 B2 * | 6/2008 | Lection et al. | 715/203 |
| 7,421,426 B2 * | 9/2008 | Berstis et al. | 1/1 |
| 7,433,866 B2 * | 10/2008 | Berstis et al. | 1/1 |
| 7,437,381 B2 * | 10/2008 | Berstis et al. | 1/1 |
| 7,469,331 B2 * | 12/2008 | Hepkin et al. | 711/202 |
| 7,475,021 B2 * | 1/2009 | Wilbrink et al. | 705/8 |
| 7,519,607 B2 * | 4/2009 | Anderson, IV | 1/1 |
| 7,627,590 B2 * | 12/2009 | Boguraev et al. | 1/1 |
| 7,730,054 B1 | 6/2010 | Marmaros et al. | |
| 2001/0056463 A1 | 12/2001 | Grady et al. | |
| 2002/0035697 A1 | 3/2002 | McCurdy et al. | |
| 2002/0048369 A1 | 4/2002 | Ginter et al. | |
| 2002/0065848 A1 * | 5/2002 | Walker et al. | 707/511 |
| 2002/0078045 A1 | 6/2002 | Dutta | |
| 2002/0095443 A1 | 7/2002 | Kovack | |
| 2002/0184159 A1 | 12/2002 | Tadayon et al. | |
| 2003/0074369 A1 | 4/2003 | Schuetze et al. | |
| 2003/0126235 A1 * | 7/2003 | Chandrasekar et al. | 709/220 |
| 2003/0145306 A1 * | 7/2003 | Melahn et al. | 717/101 |
| 2004/0049571 A1 | 3/2004 | Johnson et al. | |
| 2004/0088415 A1 | 5/2004 | Chandrasekar et al. | |
| 2006/0155782 A1 | 7/2006 | Berstis et al. | |
| 2006/0173818 A1 * | 8/2006 | Berstis et al. | 707/3 |
| 2008/0222000 A1 * | 9/2008 | Berstis et al. | 705/14 |
| 2008/0275871 A1 * | 11/2008 | Berstis et al. | 707/5 |

OTHER PUBLICATIONS

Notice of Allowance dated May 20, 2008 for U.S. Appl. No. 11/032,872.
Non-final office action dated Apr. 19, 2007 for U.S. Appl. No. 11/032,871.
Notice of Allowance dated Sep. 12, 2007 for U.S. Appl. No. 11/032,871.
Non-final office action dated Apr. 25, 2007 for U.S. Appl. No. 11/032,879.
Notice of Allowance dated Jul. 28, 2008 for U.S. Appl. No. 11/032,879.
Notice of Allowance dated Sep. 29, 2010 for U.S. Appl. No. 12/166,082.
Non-final office action dated Nov. 26, 2010 for U.S. Appl. No. 12/122,186.
Non-final office action dated May 14, 2007 for U.S. Appl. No. 11/039,534.
Final office action dated Oct. 26, 2007 for U.S. Appl. No. 11/039,534.
Examiner's Answer dated Jun. 20, 2008 for U.S. Appl. No. 11/039,534.
Board decision dated Sep. 27, 2010 for U.S. Appl. No. 11/039,534.
Hutchinson, Ian; "Graphics for Inclusion in Electronic Documents", Feb. 6, 2005, http://silas.psfc.mit.edu/elec_fig_figures, pp. 1-14.

* cited by examiner

SYSTEMS, METHODS, AND MEDIA FOR AGGREGATING ELECTRONIC DOCUMENT USAGE INFORMATION

This application is a continuation of U.S. application Ser. No. 11/032,871, filed Jan. 11, 2005 now U.S. Pat. No. 7,386,569.

FIELD OF INVENTION

The present invention is in the field of data processing systems and, in particular, to systems, methods and media for aggregating document usage information for different versions of an electronic document.

BACKGROUND

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. Examples of such personal computer systems are International Business Machine Corp.'s (IBM's) PC 300, ThinkCentre, ThinkPad, Aptiva, and IntelliStation series.

The use of mobile computing devices, such as notebook PCs, personal digital assistants (PDAs), sophisticated wireless phones, etc., has also become widespread. Mobile computing devices typically exchange some functionality or performance when compared to traditional PCs in exchange for smaller size, portable power, and mobility.

The widespread use of PCs and mobile computing devices in various segments of society has resulted in a reliance on computer systems both at work and at home, such as for telecommuting, news, stock market information and trading, banking, shopping, shipping, communication in the form of hypertext transfer protocol (http) and e-mail, as well as other services. Many of these functions take advantage of the communication abilities offered by the Internet. Such connectivity has facilitated unprecedented collaboration and sharing of information between individuals, both within organizations and outside organizational structures. This collaboration has resulted in individuals having access to and sharing vast amounts of information, often in the form of electronic documents.

Electronic documents are digitized documents that contain text, graphics, photographs, etc., and can be read by various computer systems. Electronic documents may contain text or graphics, and a wide variety of file formats have been used, such as Portable Network Graphics (PNG), Joint Photographic Experts Group (JPEG), Graphics Interchange Format (GIF), Tag Image File Format (TIFF), Microsoft Word (DOC), etc. Other file formats capable of handling text and graphics include Hypertext Markup Language (HTML) and Adobe Systems Inc.'s Portable Document Format (PDF). For many applications, electronic documents, particularly PDF documents, have supplanted printed material for the dissemination of information, as many journals, newsletters, books, articles, etc., and now distributed either exclusively or non-exclusively in electronic form.

While electronic documents possess improved qualities in many ways over hardcopies, such as cost, easy of distribution, and time to prepare, disadvantages of electronic documents when compared to paper documents do exist. One deficiency of electronic documents is that it is difficult to find the most interesting or useful part of an electronic book or other document. With paper books, individuals may observe which pages are the most worn or the pages to which the book naturally opens due to frequent reading of those pages. One can easily discern which book in, say, a library is the most useful based on its wear, and one can also often find the most useful part of the book by noting the wear caused by frequent reading. Further, a user may visibly tab the most important pages of a book. Because of the virtual nature of an electronic document, however, electronic documents fail to provide such indications of frequently-read or particularly useful sections of the document.

There is, therefore, a need for an effective system to determine electronic document usage. More particularly, there is a need to aggregate usage statistics of different versions of an electronic document to increase the utility and reliability of the usage statistics and to enable a user to readily find the most frequently used sections of an electronic document, or the most frequently used electronic document in a library of electronic documents.

SUMMARY OF THE INVENTION

The problems identified above are in large part addressed by systems, methods and media for determining electronic document segment usage. Embodiments include receiving from one or more users an indication of their usage of segments of the electronic document and aggregating the segment usage indications for different versions of the electronic document received from the one or more users. Embodiments may also generally include creating document utilization information for the electronic document based on the received segment usage indications. Further embodiments may include transmitting the document utilization information to the one or more users and archiving the document utilization information. The electronic document may be in any format, such as PDF, HTML, etc. In some embodiments, usage of the electronic document may include creating a bookmark in the electronic document, an indication of how much value the user allocated to a particular segment of the electronic document.

A document usage determining system according to the present invention uses revision change history to correlate sections of a document between revisions. This system collects usage history for each segment of the document from different versions of the document. A segment may be any unit of object granularity such as document, chapter, section, page, paragraph, sentence, etc. A segment may also be a picture, graph, symbol, or other object. When a user creates a document, the usage tracking system assigns unique identifiers to segments of the electronic document. For uniquely identified segments, the tracking system records usage information. When the user reopens and edits the document, the usage information indicating the use of a segment is aggregated with the usage information for that segment compiled during prior viewing and editing of the document. Thus, the system aggregates the usage indications of the current version of a document with the usage indications of prior versions of the document.

The system implements a set of rules for assigning unique identifiers when a user edits a document to ensure correlation of edited sections between versions of the document. For example, when the user deletes less than a full segment, the system retains the identifier and usage statistics for the partially deleted segment. When the user deletes a full segment, the system drops the identifier and usage statistics for the deleted segment. Also, when the user inserts less than a full segment, the system retains the identifier and usage statistics for the segment receiving the insertion. When the user inserts a full section, a new unique identifier is assigned.

Another embodiment may also generally include a series of operations for displaying the electronic document and an indication of the document utilization information to the user. The system displays information to enable the user to readily identify the most-used segments of the document or a set of documents. The system comprises a memory module that is adapted to store an electronic document and a document reader that is adapted to display to the user the electronic document. The system also displays an indication of the usage of the electronic document by the one or more users of the document. The system can also display the usage of multiple documents in an electronic document library. The system may base usage of a document on the usage of segments of the document so that a document with frequently used segments will indicate more usage than a document with less frequently used segments. Other embodiments may include a series of operations for analyzing the document utilization information and the usage of the electronic document by the user.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

Figure 1:
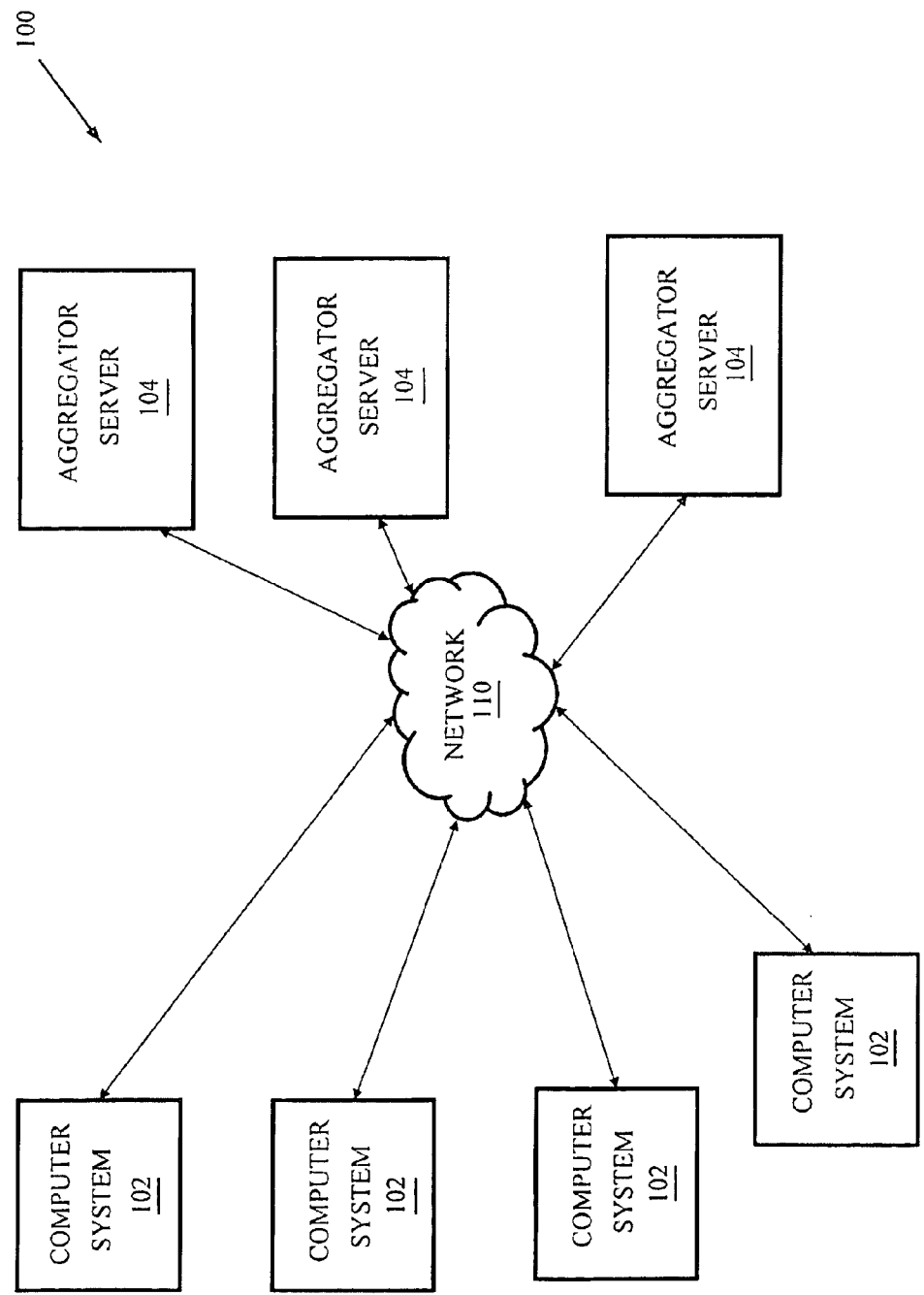
FIG. 1 depicts an environment for a system for determining electronic document usage according to one embodiment.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

The present invention provides systems, methods and media for determining the usage of an electronic document. More particularly the invention provides hardware and/or software for aggregating usage data for different versions of a document. Embodiments include a process for assigning unique identifiers to different segments of an electronic document. Usage information is determined for uniquely identified segments of the document. When a new version of the document is created, the document usage information of segments of the original version is brought forward to the new version. That is, the system associates usage indication data of identified segments of the first version with correspondingly identified segments of the second version of the electronic document. This usage information is aggregated with the usage information of corresponding segments in the second version. The usage informational of prior versions of a document from different users can also be aggregated on a segment-by-segment basis. The aggregated segment usage information associated with uniquely identified segments provides a much more reliable basis to determine segment utilization because the data is collected from a larger sample. Thus, the system of the present invention compiles usage statistics for each segment of a document or collection of documents. A segment can be any unit of granularity such as a document, chapter, section, page, paragraph, sentence, etc. The system can therefore determine what segments are most-used. The system can then display this information so that the user can readily identify the most-used segments of a document and/or a most-used document in a library of documents.

Disclosed embodiments provide document utilization information to a user viewing an electronic document. Embodiments disclose tracking the usage of an electronic document on a segment-by-segment basis by a plurality of users using computer systems. In some embodiments, the usage information is transmitted to an aggregator server, where the segment usage information for a plurality of versions from a plurality of users is aggregated and document utilization information for the particular electronic document is created. The document utilization information provides an indication of the usage of the electronic document by the plurality of users and may be transmitted to users. A document reader on the computer system may display an indication of the document utilization information along with the electronic document so that a user may see how other users have utilized the electronic document. By seeing how other users have utilized the document, a user may easily and quickly find important, interesting, or relevant portions of the electronic document, replicating the benefits of worn or used reference books or other publications in the paper-based libraries, etc. For example, a user may be able to go to the page of an electronic document that other users have spent the most time viewing, which is likely a very relevant page to most users, or at least most users within a category of users.

An embodiment of a document usage determining system of the present invention uses revision change history to correlate sections of a document between revisions. When a document is created, the system assigns a unique identifier to each segment. For each such uniquely identified segment, the system records usage information. When a user revises a document, the system aggregates the segment usage statistics of the prior version with the segment usage statistics of the newly revised version of the document. The system implements a set of rules for assigning unique identifiers when a user edits a document to ensure correlation of edited sections between versions of the document. For example, when the user deletes less than a full segment, the system retains the identifier and usage statistics for the partially deleted segment. When the user deletes a full segment, the system drops the identifier and usage statistics for the deleted segment. Also, when the user inserts less than a full segment, the system retains the identifier and usage statistics for the segment receiving the insertion. When the user inserts a full section, a new unique identifier is assigned.

While specific embodiments will be described below with reference to particular configurations of hardware and/or software, those of skill in the art will realize that embodiments of the present invention may advantageously be implemented with other substantially equivalent hardware and/or software systems.

Turning now to the drawings, FIG. 1 depicts an environment for a system for determining electronic document usage according to one embodiment. In the depicted embodiment, document usage system 100 includes a plurality of computer systems 102 in communication with a network 110. The depicted document usage system 100 also includes one or more aggregator servers 104 in communication with network 110 for aggregating document usage information. Any of the components of the document usage system 100 may be physically adjacent or located as part of the same computer system in some network arrangements. Network 110 may be any type of data communications channel, such as the Internet, an intranet, a LAN, a WAN, an Ethernet network, a wireless network, a proprietary network, a broadband cable network, etc. Those skilled in the art will recognize, however, that the invention described herein may be implemented utilizing any type of data communications channel.

Computer systems 102 may include personal computers, workstations, servers, mainframe computers, notebook or laptop computers, desktop computers, personal digital assistants (PDAs), tablet or palm personal computers, set-top boxes, mobile phones, wireless devices, or the like. A user may use a computer system 102 to view or read electronic documents using a browser, dedicated electronic document reader software (such as Adobe Systems Inc.'s Adobe Acrobat® or Reader), or other software. In one embodiment, computer systems 102 may be a personal computer that has electronic document reader software executing on the system. In another embodiment, computer systems 102 may be a handheld, mobile device such as a tablet personal computer or PDA with an on-board electronic document reader. Computer systems 102 are described in more detail in relation to FIG. 2.

Electronic documents are digitized documents that contain text, graphics, photographs, etc., and can be read by various computer systems. Electronic documents may contain text or graphics and may use any type of file format, such as PNG, JPEG, GIF, TIFF, DOC, HTML, PDF, etc. Electronic documents may be of any type, such as books, articles, journals, World Wide Web (Web) pages, etc. Electronic documents may include multiple pages and/or other means of organizing the document, such as chapters, sections, volumes, etc.

Aggregator servers 104 may be executing on one or more personal computers, workstations, servers, mainframe computers, notebook or laptop computers, desktop computers, PDAs, tablet or palm personal computers, set-top boxes, mobile phones, wireless device, or the like. In one embodiment, the aggregator server 104 may be a server in communication with a plurality of computer systems 102 via network 110. Aggregator servers 104 are described in more detail in relation to FIG. 3. In one embodiment, a single aggregator server 104 may be used. In this embodiment, the aggregator server 104 facilitates determining electronic document usage by receiving indications of electronic document usage from the computer systems 102 and processing the data. The aggregator server 104 of this embodiment may include local storage, such as a hard drive, or may include other storage, such as a hard drive array, remote storage over network 110, a Redundant Array of Independent Disks (RAID) system, etc. In another embodiment, a plurality of aggregator servers 104 may be utilized for redundancy. Also, some documents for which usage is tracked may be stored and aggregated by one server while other document for which usage is tracked may be stored and aggregated by another server.

Figure 2:
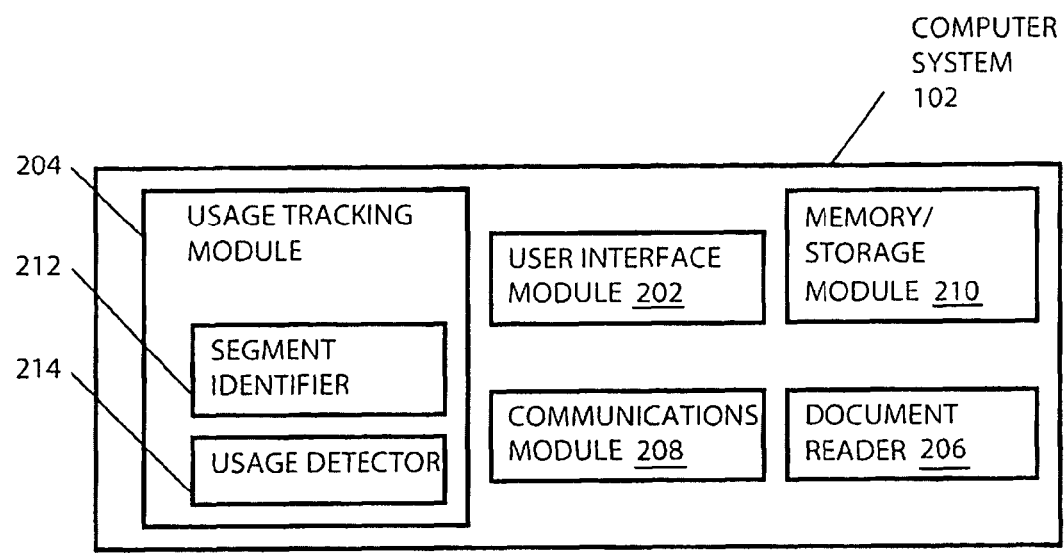
FIG. 2 depicts one embodiment of a computer system of the electronic document usage system of FIG. 1.

Referring now to FIG. 2, there is shown one embodiment of a computer system 102 of the electronic document usage system 100 of FIG. 1. In the embodiment of FIG. 2, the computer system 102 includes a user interface module 202, a usage tracking module 204, a document reader module 206, a communications module 208, and a memory module 210. The user interface module 202 may, in one embodiment, receive input from the user and display information to, or otherwise communicate with, the user. For example, the user interface module 202 may receive user input entered via a user input device, such as keyboard, mouse, pen, voice command system, joystick, buttons, stylus, etc. A user may input any type of information, such as requests to open or close an electronic document, a request to move forward or backward in an electronic document, a request to create or delete a book-nark, a request to go to a particular portion or page of an electronic document, etc. The user interface module 202 may also communicate information to the user, such as by monitor or display device, printer, sound card, etc.

Usage tracking module 204 may track the user's usage of an electronic document being viewed on the computer system 102, such as by using the document reader 206. Usage tracking module 204 comprises a segment identifier 212 and a usage detector 214. Segment identifier 212 assigns unique identifiers to segments of a document. In some embodiments, when a document is created, segment identifier 212 may assign a unique identifier to each segment created. When the document is later reopened, segment identifier 212 retrieves preexisting assigned identifiers or assigns a new identifier to one or more of the segments according to a set of rules, as discussed in detail with reference to FIG. 5.

Usage detector 214 detects usage of identified segments of an electronic document. Usage detector 214 may detect, for instance, opening or closing the electronic document, editing the document, creating or deleting bookmarks in the electronic document, time spent with the electronic document open, printing the electronic document, e-mailing or otherwise transmitting the electronic document, etc. in one embodiment, tracking module 204 tracks the usage of the electronic document based on utilization of segments such as pages, chapters, sections, paragraphs, etc., of the document.

In a further embodiment, when tracking module 204 tracks time spent with the electronic document, user input via the user interface module (i.e., keyboard entries, mouse movement, etc.) is monitored to ensure that the user is active on the computer system 102. In this embodiment, time spent after the user has abandoned computer system 102 is not counted as time spent viewing the electronic document. Usage tracking module 204 may estimate when a user stops viewing an electronic document based upon a predetermined time interval. For instance, usage tracking module 204 may stop counting time spent after detecting a ten minute interval of inactivity since the last user input. As a result, this embodiment may advantageously provide a more accurate measurement of how much time a user spends viewing a particular segment of an electronic document.

Document reader 206 may be any software module that displays an electronic document. Examples of currently existing document readers 206 include Adobe Systems Inc.'s Adobe Acrobat® or Reader, Microsoft Corporations' Word or Reader, Palm Corporation's Reader, MobiPocket Reader, etc. The communications module 208 may transmit or receive information between the computer system 102 and any other system, including the aggregator servers 104 via the network 110. Communication module 208 transmits information that includes segment usage information for electronic documents, and receives information that includes document utilization information for electronic documents. Memory module 210 may store information, such as user preferences, configuration settings, electronic documents, segment usage information, document utilization information, etc. Memory module 210 may include any type of memory, including fixed or removable media, permanent or temporary storage, volatile or non-volatile memory, hard drives, CD-ROMs, etc.

Figure 3:
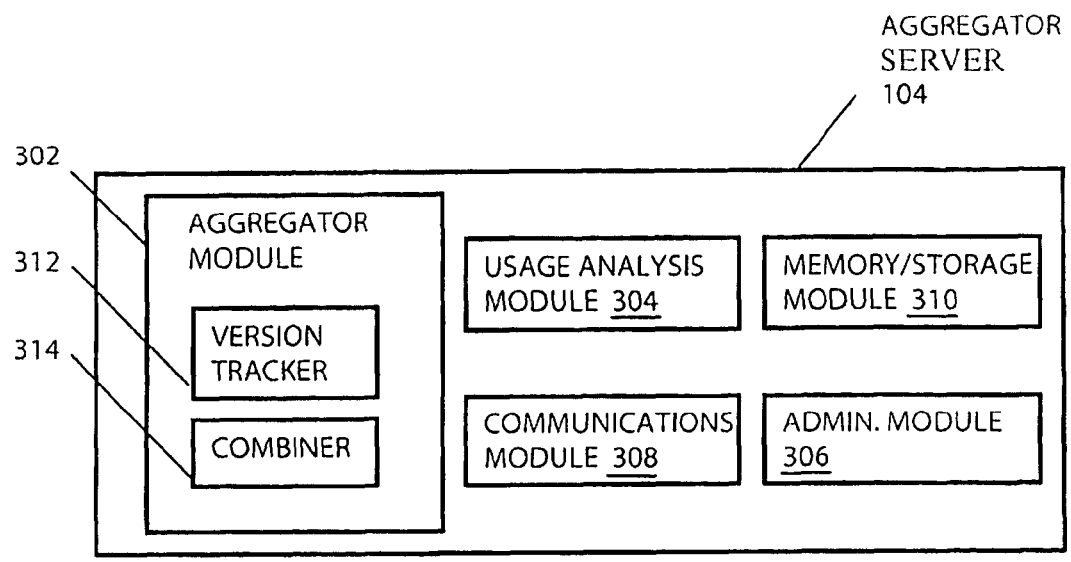
FIG. 3 depicts one embodiment of an aggregator server of the electronic document usage system of FIG. 1.

FIG. 3 shows one embodiment of an aggregator server 104 of the electronic document usage system 100 of FIG. 1. In the embodiment of FIG. 3, the aggregator server 104 includes an aggregator module 302, a usage analysis module 304, an administration module 306, a communications module 308, and a memory module 310. Aggregator module 302 comprises a version tracker 312 and a usage data combiner 314. Version tracker 312 determines whether the usage data of a version of the document has been updated with the usage data of a different version of the document. If the usage data of a version is not updated with prior usage data from one or more other versions of the document, then version tracker 312 causes combiner 314 to perform the update. That is, the system associates the usage indication data of segments of prior versions with the corresponding segments of a current version of the document. Combiner 314 may further combine usage data for prior versions with usage data collected for the current version. Further, combiner 314 may combine prior version usage information from a plurality of users. For example, aggregator module 302 may aggregate the amount of time that each user spent on a particular segment of an electronic document for all users who viewed the document. In this embodiment, usage analysis module 304 determines which segments of the electronic document users have spent the most time viewing. Time spent viewing a segment of a document may be indicative of the value, utility, or relevance of the information included in that segment.

The usage analysis module 304 may provide more sophisticated analysis of the document usage information collected and aggregated by the aggregator module 302. For example, the usage analysis module 304 may sort and/or analyze the usage information by type Of user, class of user, type of usage (e.g., printing, viewing, etc.), different timeframes (e.g., giving more weight to more recent usage), etc. In one embodiment, an administrator or other user may customize the type of analysis performed by the usage analysis module 304.

The administration module 306 may access administrative data and perform various administrative tasks. Permissions to different functions of the electronic document usage system 100 may be restricted to those users with appropriate needs and training. In one embodiment, access to the administration module 306 would be limited to personnel with appropriate training and authority. In this embodiment, a user with administrator access may add/delete users, passwords, electronic documents, etc. In a further embodiment, a user with appropriate access may configure the type of analysis performed by the usage analysis module 304 or aggregator module 302, add new electronic documents to the system 100, change archiving settings, add or delete aggregator servers 104, etc.

The communications module 308 may perform any transmission or receipt of information between the aggregator server 104 and any other system, including the computer systems 102 via the network 110. Communications module 308 may transmit and/or receive information that includes indications of segment usage for electronic documents, document utilization information, etc. In one embodiment communications module 308 transmits aggregate segment usage information to a computer system 102. The user may display this information using user interface module 202.

Memory module 310 may store information, such as user preferences, electronic documents, document usage information, document utilization information, etc. Memory module 310 may include any type of data storage, including fixed or removable media, permanent or temporary storage, volatile or non-volatile memory, hard drives, CD-ROMs, etc.

In an embodiment of the invention, the user of computer system 102 specifies a level of object granularity, i.e., segment size, such as document, chapter, section, paragraph, etc. When the user creates a new document, segment identifier 212 assigns a unique identifier to each segment inserted into the new document and usage detector 214 compiles usage statistics for each segment. When the user finishes editing the document and closes it, the identifier and the segment usage statistics are stored in memory module 210. Communications module 208 transmits the segment usage information to aggregator server 104.

When a user reopens the document to create a new version for further review or editing, usage detector 214 compiles usage statistics for each segment while the document remains reopened or until a finite amount of time has transpired without user activity. Communications module 208 transmits the segment usage information for the new version to aggregator server 104. Version tracker 312 determines if the new version usage information includes the usage information of the original version. Combiner 314 aggregates the segment usage statistics thus compiled for the current document viewing or editing session with the segment usage statistics of prior versions of the document. In this way, the system adds or combines the history of document usage during prior versions with the document usage history of the most current version of the document. This helps to prevent document usage statistics from reflecting too small of a sample.

One item of segment usage information is time spent viewing a segment. For example, suppose a rendering tool such as Adobe Acrobat illustrates the document on a color video monitor. Suppose further that the viewer is viewing a portion of a page of the document showing two paragraphs and the object granularity level is a paragraph. The importance to the user of the two displayed paragraphs is indicated by the time spent viewing them. The unique identifier for each paragraph is associated in memory with the time spent viewing the paragraph. The color video monitor may therefore display an indication of the time spent viewing each paragraph in the document so the user can readily identify the most used segments of the document. In an embodiment of the invention, when the user is viewing a document, the system may also display a panel showing a table of contents of the document. For each entry in the table, the system displays an indicator of use. The system may indicate the level of use of the material corresponding to an entry by use of colors or by a histogram. For example, the color red may indicate high use, with yellow indicating moderate use, and blue indicating low use. In another embodiment of the invention, the system may display the amount of time the user views each segment.

Figure 4:
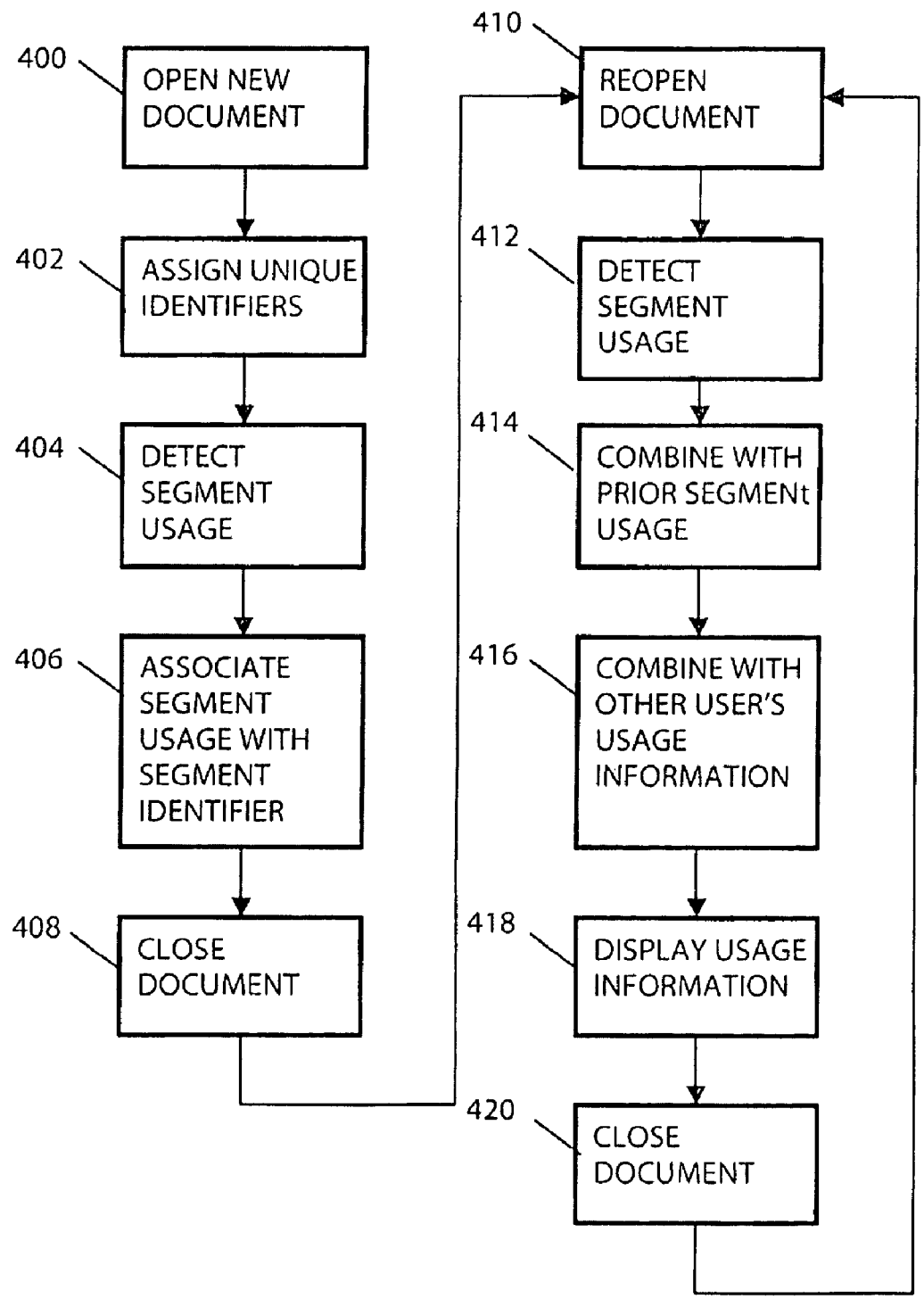
FIG. 4 depicts an example of a flow chart for determining electronic document segment usage according to one embodiment.

FIG. 4 is a flow chart of an embodiment of the process of the present invention. Initially, the user opens a new document (element 400). As the user makes insertions and deletions in the document, the system implementing the process of FIG. 4 assigns a unique identifier to each segment in the document (element 402), wherein a segment is a specified object such as a chapter, section, page, paragraph, picture, chart, sentence, etc. The system detects usage for each uniquely identified segment (element 404). Segment usage data is associated with the identifier of the segment (element 406). When the user ends the editing and reviewing session, the user closes the document (element 408).

Later, when the same or different user opens the document (element 410) the segments have the same identifiers as before. For each segment, the system compiles new segment usage information (element 412). The system combines this usage information with the usage information acquired before from the prior version on a segment-by-segment basis (element 414). That is, the system aggregates the usage statistics for a segment in the reopened version of the document with the usage statistics of the segment in the previously opened document that has the same identifier as the segment in the reopened version.

The aggregated segment usage information for a user can be combined with the aggregated segment usage information for other users to produce aggregate document utilization information (element 416). Tills document utilization information may be displayed, automatically or upon request by the user (element 418) so that the user can readily see the most-used sections of the document. In one embodiment a table of contents can be displayed with the usage of each entry in the table displayed next to each entry. The user can then click on the entry of a frequently used segment, and the system will display that segment. When the current editing and reviewing session is ended, the document is closed (element 420). Although not shown in FIG. 4, the system may also display document utilization information when the document is closed.

Figure 5:
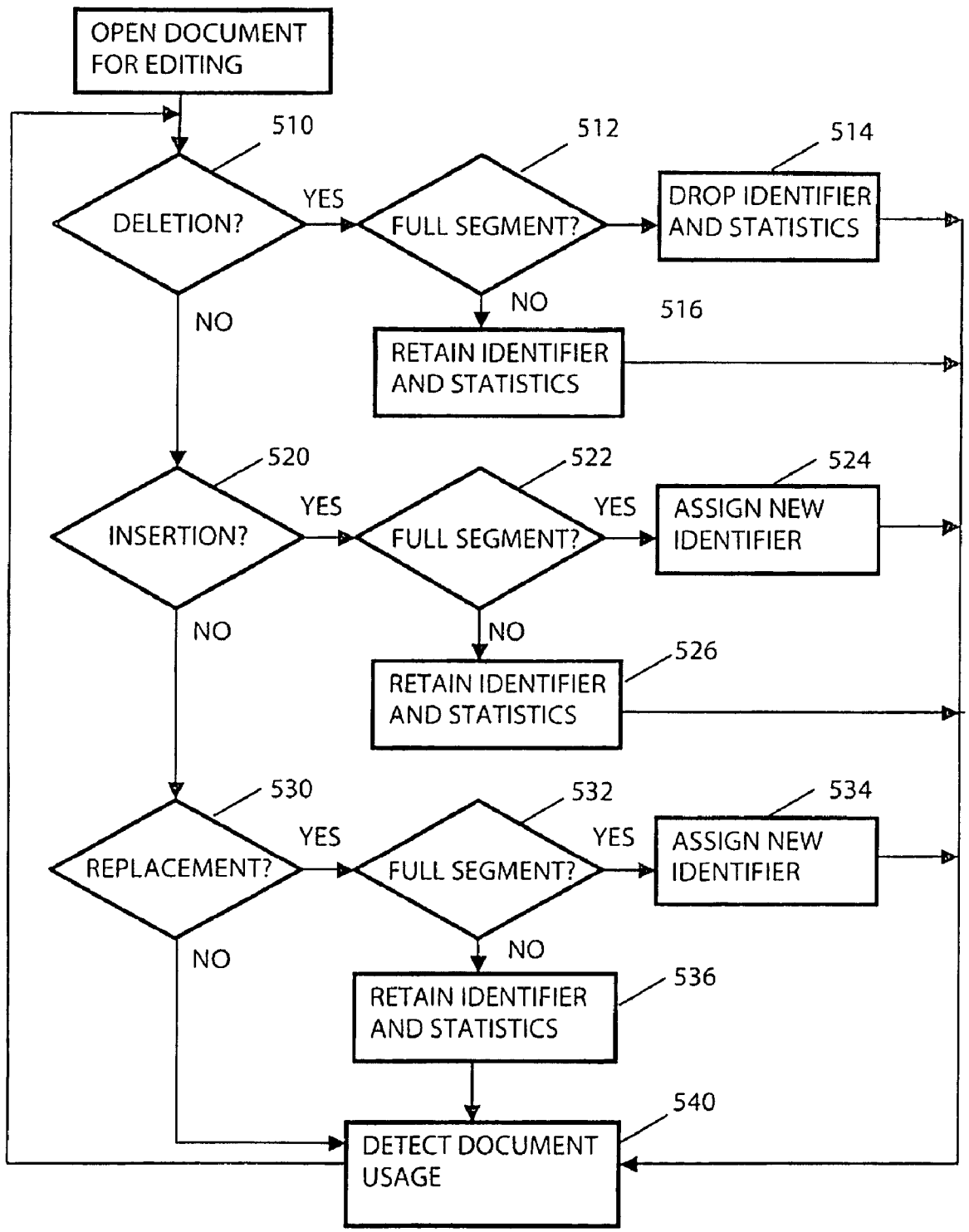
FIG. 5 depicts an example of a flow chart of rules followed for assigning and retaining segment identifiers.

FIG. 5 depicts an example of a flow chart for changing or retaining segment identifiers. At (element 500) a document is opened. The system that implements the process depicted in FIG. 5 parses the document into segments at the document, chapter, section, page, paragraph, etc., level. The document may have segments containing text, pictures, clip art, word art, graphs, figures and symbols, so that a unique identifier can be assigned to each picture or other item in the document. Thus, the system assigns each segment—whether text, picture, symbols, etc.—a unique identifier such as a unique number or alphanumeric combination. The user may edit the document by making deletions, insertions and replacements of text, pictures, and symbols in the document.

The process depicted in FIG. 5 includes following of a set of rules to determine whether to assign or retain an identifier in the event of a deletion, insertion or replacement. This enables correlation of segments between different versions of a document. Thus, the system aggregates the usage statistics for segments having the same identifier in each of a plurality of document versions. Suppose for example, that a user is one of a plurality of users of a document and that there are multiple versions of the document, each version edited by the same user or a different user. In an embodiment of the invention, the user may easily detect which segments in which versions are the most recently edited. Suppose further that the user edits the document by deletion, insertion or replacement of a segment or portion of a segment. The system determines whether there is a deletion (element 510) an insertion (element 520) or a replacement (element 530) and assigns a new identifier or retains the existing identifier based on a set of rules.

If there is a deletion (element 510) the system determines whether the user has deleted a full segment or only a portion of segment (element 512). If the user deletes a full segment, the system drops or ignores the identifier and usage statistics of the deleted segment (element 514). The system may then continue to detect document usage (element 540). If the user deletes part of a segment, the system retains the identifier and usage statistics for the partially deleted segment (element 516). Then the system continues to detect document usage (element 540).

On the other hand, if there is an insertion (element 520), the system determines whether the user has inserted an entire segment or has made an insertion within a segment (element 522). If the user inserts a new segment, the system assigns a unique identifier to the new segment (element 524). Then the system continues to detect document usage (element 540). If there is an insertion within a segment, the system retains the identifier and usage statistics of that segment (element 526). The system may then continue to detect document usage (element 540).

Similarly, if there is a replacement (element 530) the system determines whether an entire segment was replaced or only a portion thereof (element 532). If the user replaces an entire segment, the identifier and usage statistics of the replaced segment are ignored, and a new identifier is assigned to the replacement segment (element 534). Then the system continues to detect document usage (element 540). If the user replaces only a portion of a segment, the identifier and associated usage statistics of the segment are retained (element 536). The system continues to detect document usage (element 540).

The methods described above provide a mechanism for determining and displaying the segment usage for one or more electronic documents. For example, a collection of articles in PDF form may be distributed to all interested group, such as professors across the world. Each professor may access the articles within the electronic document in a way that they find useful. Each would naturally focus on particular parts of the electronic document that was particularly useful to them. Computer systems 102 may transmit the segment usage data of one or more users of the electronic document to a central aggregator server 104. The aggregator server 104 would then collect and aggregate all of the usage information and create document utilization information. In this embodiment, the document utilization information could include information on how much time the average reader spent on each article and on each page. Aggregator server 104 transmits this document utilization information back to the users (on their computer systems 102). When any of these professors, or any other readers, opened the electronic document, they would see document utilization information. For example, any articles that professors heavily access could be highlighted or otherwise called out. This would allow a professor receiving the electronic document to immediately see which articles and pages their peers found most useful or interesting, saving them the time and trouble of having to review each page. Many other combinations and examples are, of course, possible.

Note that a user may use one tool, such as Microsoft WORD, to author a document and use another tool, such as Adobe Acrobat, to view the document. Thus, the user uses the authoring tool to create and modify the document. As the viewer views the document displayed by the authoring tool, the authoring tool can also display tags associated with each segment. Each tag may contain segment usage information for the segment associated with the tag. The system may display each tag in a position close to the location of the segment with which it is associated. In addition, or alternatively, the user may cause to be displayed a table of contents or index of segments with each entry in the table or index tagged to indicate its relative usage by the one or more users of the document. Suppose then that the user converts the authored document into PDF file format using Adobe Acrobat software. The Adobe Acrobat document rendering software can strip the tags from the document so that the system will not display them when the system displays the PDF file. The user may then cause the rendering software to display segment usage data at the user's option. If a user transforms a file from one format to another—the tags identifying each segment and the corresponding usage data should always transfer as well. Whether or not the usage data is then DISPLAYED should be optional.

In general, the routines executed to implement the embodiments of the invention, may be part of an operating system or a specific application, component, program, module, object, or sequence of instructions. The computer program of the present invention typically is comprised of a multitude of instructions translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Another embodiment of the invention provides a machine-accessible medium containing instructions effective, when executing in a data processing system, to cause the system to perform a series of operations for determining usage of different segments of electronic documents. The series of operations generally include receiving an indication of the usage by a user of each segment of a document. In an original version of the document, the system assigns a unique identifier to each segment of the document. The system detects the usage of each segment and stores the usage information in association with the unique segment identifier. When the user creates and/or edits a subsequent version of the document, the system retains the identifiers of the segments that the system assigned when the document was created. The system compiles the usage information for each segment of the subsequent version. The system aggregates this usage information with the usage statistics of prior versions of the document. The system performs this aggregation on a segment-by-segment basis so that the usage indications of all the segments in the different versions that have the same identifier are combined. The series of operations may also generally include creating document utilization information for the electronic document, wherein the system bases the document utilization information on the received usage indications for each segment of the document from one or more users. Further embodiments may include a series of operations for transmitting the document utilization information to the one or more users and archiving the document utilization information.

It will be apparent to those skilled in the art having the benefit of this disclosure that the present invention contemplates methods, systems, and media for aggregating document segment usage information from a plurality of versions of document and from a plurality of users. It is understood that the form of the invention shown and described in the detailed description and the drawings are to be taken merely as examples. It is intended that the following claims be interpreted broadly to embrace all the variations of the example embodiments disclosed.

What is claimed is:

1. A computer program product for aggregating document usage information for an electronic document, the computer program product comprising:
one or more computer-readable tangible storage devices;
program instructions, stored on at least one of the one or more storage devices, to assign a unique identifier to each segment of a plurality of segments of the electronic document at a time of creation of the electronic document;
program instructions, stored on at least one of the one or more storage devices, to determine usage indication data associated with each segment of the plurality of segments of the electronic document, wherein the usage indication data comprise a measure of time spent using the electronic document;
program instructions, stored on at least one of the one or more storage devices, to aggregate the usage indication data for a plurality of users of the electronic document on a segment by segment basis; and
program instructions, stored on at least one of the one or more storage devices, to communicate to a user of the electronic document the aggregate usage indication data on a segment by segment basis.

2. The computer program product of claim 1, further comprising program instructions, stored on at least one of the one or more storage devices, to aggregate usage indication data for corresponding segments of a plurality of versions of the electronic document on a segment by segment basis.

3. The computer program product of claim 1, further comprising program instructions, stored on at least one of the one or more storage devices, to assign a unique identifier to a new segment added into a past version of the electronic document.

4. The computer program product of claim 1, further comprising program instructions, stored on at least one of the one or more storage devices, to insert a bookmark in the electronic document as requested by a user.

5. The computer program product of claim 1, wherein the program instructions to determine usage indication data associated with each segment of the plurality of segments of the electronic document determine how much time a user spent viewing the segment of the electronic document.

6. The computer program product of claim 1, wherein each segment of the plurality of segments is selected from the group consisting of a chapter, a section, a page, a paragraph, and a sentence.

7. The computer program product of claim 1, wherein the program instructions to determine the usage indication data associated with each segment of the plurality of segments of the electronic document measure one or more of the following types of activities:
opening the electronic document;
spending time with the electronic document open;
editing the electronic document;
printing the electronic document; and
e-mailing or otherwise transmitting the electronic document.

8. A computer system for aggregating usage indications for an electronic document, the computer system comprising:
one or more processors, one or more computer-readable memories and one or more computer-readable tangible storage devices;
program instructions, stored on at least one of the one or more storage devices for execution by at least one of the one or more processors via at least one of the one or more memories, to assign a unique identifier to each segment of a plurality of segments of the electronic document at a time of creation of the electronic document;
program instructions, stored on at least one of the one or more storage devices for execution by at least one of the one or more processors via at least one of the one or more memories, to determine usage indication data associated with each segment of the plurality of segments of the electronic document, wherein the usage indication data comprise a measure of time spent using the electronic document;

program instructions, stored on at least one of the one or more storage devices for execution by at least one of the one or more processors via at least one of the one or more memories, to aggregate the usage indication data for a plurality of users of the electronic document on a segment by segment basis; and program instructions, stored on at least one of the one or more storage devices for execution by at least one of the one or more processors via at least one of the one or more memories, to communicate to a user of the electronic document the aggregate usage indication data on a segment by segment basis.

9. The computer system of claim 8, further comprising program instructions, stored on at least one of the one or more storage devices for execution by at least one of the one or more processors via at least one of the one or more memories, to assign a unique identifier to a new segment added to a version of the electronic document.

10. The computer system of claim 8, wherein the program instructions to aggregate the usage indication data for the plurality of users of the electronic document on a segment by segment basis aggregate the usage information for a plurality of versions of the electronic document on a segment by segment basis.

11. The computer system of claim 8, wherein the program instructions to aggregate the usage indication data for the plurality of users of the electronic document on a segment by segment basis determine how much time the plurality of users spent viewing each segment of the plurality of segments of the electronic document.

12. The computer system of claim 8, wherein each segment of the plurality of segments is selected from the group consisting of a chapter, a section, a page, a paragraph, and a sentence.

13. The computer system of claim 8, wherein the program instructions to aggregate the usage indication data for the plurality of users of the electronic document on a segment by segment basis aggregate the amount of time that each user of the plurality of users spent on each segment of the plurality of segments of the electronic document.

14. The computer system of claim 8, wherein the program instructions to aggregate the usage indication data for the plurality of users of the electronic document on a segment by segment basis determine an amount of time spent by an average reader on each segment of the plurality of segments of the electronic document.

15. A computer program product to aggregate document usage information for an electronic document, the computer program product comprising:

one or more computer-readable tangible storage devices;

program instructions, stored on at least one of the one or more storage devices, to receive usage indication data for a plurality of users of the electronic document on a segment by segment basis, wherein:
the usage indication data provides a measure of time spent using the electronic document;
the electronic document is divided into a plurality of segments; and
each segment of the plurality of segments of the electronic document has a unique identifier;

program instructions, stored on at least one of the one or more storage devices, to aggregate the usage indication data for the plurality of users of the electronic document on a segment by segment basis; and program instructions, stored on at least one of the one or more storage devices, to communicate to a user of the electronic document aggregate usage indication data on a segment by segment basis.

16. The computer program product of claim 15, wherein the program instructions to aggregate the usage indication data for the plurality of users of the electronic document on a segment by segment basis aggregate how much time the plurality of users spent viewing the electronic document on a segment by segment basis.

17. The computer program product of claim 16, wherein the program instructions to aggregate the usage indication data for the plurality of users of the electronic document on a segment by segment basis aggregate the amount of time that each user of the plurality of users spent on each segment of the plurality of segments of the electronic document.

18. The computer program product of claim 16, wherein the program instructions to aggregate the usage indication data for the plurality of users of the electronic document on a segment by segment basis determine an amount of time spent by an average reader on each segment of the plurality of segments of the electronic document.

19. The computer program product of claim 15, wherein the program instructions further comprise instructions to assign a unique identifier to a new segment added to a version of the electronic document.

20. The computer program product of claim 15, wherein the program instructions to aggregate the usage indication data for the plurality of users of the electronic document on a segment by segment basis aggregate the usage information for a plurality of versions of the electronic document on a segment by segment basis.

21. The computer program product of claim 15, wherein each segment of the plurality of segments is selected from the group consisting of a chapter, a section, a page, a paragraph, and a sentence.

22. A computer system comprising one or more computers programmed with instructions that are effective when executed to perform operations comprising:

assigning a unique identifier to each segment of a plurality of segments of the electronic document at a time of creation of the electronic document;

determining usage indication data associated with each segment of the plurality of segments of the electronic document, wherein the usage indication data comprise a measure of time spent using the electronic document;

aggregating the usage indication data for a plurality of users of the electronic document on a segment by segment basis; and communicating to a user of the electronic document the aggregate usage indication data on a segment by segment basis.

23. The computer system of claim 22, the operations further comprising:

aggregating usage indication data for corresponding segments of a plurality of versions of the electronic document on a segment by segment basis.

24. The computer system of claim 22, the operations further comprising:

assigning a unique identifier to a new segment added into a past version of the electronic document.

25. The computer system of claim 22, the operations further comprising:

inserting a bookmark in the electronic document as requested by a user.

26. The computer system of claim 22, wherein determining usage indication data associated with each segment of the plurality of segments of the electronic document comprises determining how much time a user spent viewing the segment of the electronic document.

27. The computer system of claim 22, wherein each segment of the plurality of segments is selected from the group consisting of a chapter, a section, a page, a paragraph, and a sentence.

28. The computer system of claim 22, determining the usage indication data associated with each segment of the plurality of segments of the electronic document measures one or more of the following types of activities:
- opening the electronic document;
- spending time with the electronic document open;
- editing the electronic document;
- printing the electronic document; and
- e-mailing or otherwise transmitting the electronic document.

\* \* \* \* \*